(12) United States Patent
Kailash et al.

(10) Patent No.: US 8,458,786 B1
(45) Date of Patent: Jun. 4, 2013

(54) AUTOMATED DYNAMIC TUNNEL MANAGEMENT

(75) Inventors: Kailash Kailash, San Jose, CA (US); Jose Raphel, Austin, TX (US); Srikanth Devarajan, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 337 days.

(21) Appl. No.: 12/856,425

(22) Filed: Aug. 13, 2010

(51) Int. Cl.
*G06F 17/30* (2006.01)
*H04L 29/06* (2006.01)
*H04L 12/28* (2006.01)

(52) U.S. Cl.
USPC .......... 726/14; 726/4; 726/6; 726/12; 726/13; 726/15; 713/151; 713/153; 713/154; 713/155; 713/168; 713/175; 709/220; 709/221; 709/223; 709/225; 709/227; 709/228; 709/229; 709/230; 709/238; 709/240; 709/244; 709/249; 709/250

(58) Field of Classification Search
USPC .......................................................... 726/14
See application file for complete search history.

(56) References Cited

U.S. PATENT DOCUMENTS

| | | | |
|---|---|---|---|
| 7,237,263 B1* | 6/2007 | Boscolo et al. | 726/15 |
| 7,296,152 B1* | 11/2007 | MacPherson et al. | 713/168 |
| 7,574,495 B1* | 8/2009 | Rajagopalan | 709/223 |
| 7,774,837 B2* | 8/2010 | McAlister | 726/15 |
| 7,827,278 B2* | 11/2010 | Chen et al. | 709/225 |
| 8,086,845 B2* | 12/2011 | Jain et al. | 713/151 |
| 8,146,148 B2* | 3/2012 | Cheriton | 726/15 |
| 2003/0135753 A1* | 7/2003 | Batra et al. | 713/201 |
| 2004/0225895 A1* | 11/2004 | Mukherjee et al. | 713/201 |
| 2005/0063411 A1* | 3/2005 | Wang et al. | 370/437 |
| 2005/0235352 A1* | 10/2005 | Staats et al. | 726/14 |
| 2005/0273849 A1* | 12/2005 | Araujo et al. | 726/12 |
| 2006/0056297 A1* | 3/2006 | Bryson et al. | 370/230 |
| 2006/0187942 A1* | 8/2006 | Mizutani et al. | 370/401 |
| 2007/0234061 A1* | 10/2007 | Teo | 713/178 |
| 2008/0031235 A1* | 2/2008 | Harris et al. | 370/389 |
| 2009/0016337 A1* | 1/2009 | Jorgensen et al. | 370/389 |
| 2009/0034431 A1* | 2/2009 | Nagarajan et al. | 370/254 |
| 2009/0113516 A1* | 4/2009 | Vorreiter et al. | 726/1 |
| 2010/0091676 A1* | 4/2010 | Moran et al. | 370/252 |
| 2010/0097992 A1* | 4/2010 | Velev et al. | 370/328 |
| 2010/0162383 A1* | 6/2010 | Linden et al. | 726/13 |
| 2010/0192202 A1* | 7/2010 | Ker | 726/4 |
| 2011/0090815 A1* | 4/2011 | Gundavelli et al. | 370/253 |

OTHER PUBLICATIONS

Juniper Networks, 'Introduction to Group VPN', 2011, Juniper Networks, entire document, http://www.thomas-krenn.com/en/index.html.*

* cited by examiner

*Primary Examiner* — Edan Orgad
*Assistant Examiner* — Ronald Baum
(74) *Attorney, Agent, or Firm* — Clements Bernard PLLC; Lawrence A. Baratta, Jr.; Christopher L. Bernard (57) ABSTRACT

Systems, methods and apparatus for tunneling in a cloud based security system. In an aspect, tunnel session data describing authentication and unauthenticated sessions, and location data describing tunnel identifiers for tunnels, locations, and security policies specific to the locations are accessed. Tunnel packets are received, and for each tunnel packet it is determined, from the tunnel identifier associated with the packet, whether a session entry in the session data exists for the tunnel identified by the tunnel identifier. In response to determining that a session entry does not exist in the session data, then a session entry is created for the tunnel identifier, an authentication process to determine a location to be associated with the session entry is performed, and an entry in the location data for the location is associated with the session entry.

23 Claims, 5 Drawing Sheets

AUTOMATED DYNAMIC TUNNEL MANAGEMENT

BACKGROUND

This disclosure relates to tunneling and security provisioning.

The prevalence and accessibility of computer networks requires security measures to protect valuable information. An enterprise, for example, can implement such security measures by use of a layered security system. Such a layered security system can be implemented at the network edge of the enterprise, e.g., firewalls, gateway security agents, etc. Additionally, a layered security system can also include security processes and agents that are implemented throughout the enterprises, e.g., virus scanning software on each computer device within the enterprise, content filtering software, content monitoring software, etc.

However, such layered security systems are prone to processing inefficiencies and can require many resources within the enterprise to maintain the systems. The use of an "in-the-cloud" distributed security system that provides security services external to a network edge of an enterprise can overcome many of these processing inefficiencies. One example of such a system is the Global Cloud Infrastructure provided by Zscaler, Inc., of Sunnyvale, Calif.

In such a distributed security system, an enterprise can transmit data to and receive data from the distributed security system by use of tunneling technologies. A tunneling protocol enables one network protocol (the delivery protocol) to encapsulate packets that conform to a payload protocol to carry a payload over an incompatible delivery network, or to provide a secure path through an open network. Example tunneling technologies include generic routing encapsulation (GRE), layer two tunneling protocol (L2TP), point-to-point tunneling protocol (PPTP), Secure Socket Tunneling Protocol (SSTP) or IPSec protocols may be used. Virtual private network (VPN) routers and VPN concentrators can be used to achieve the traffic redirection for tunneling.

The use of tunneling, however, presents the enterprise and the security provider with specific challenges and problems. In particular, tunnels, such as GRE tunnels, are used by cloud based services to direct network traffic through a cloud resident proxy node. Each of the proxy nodes stores a list of valid origins that are allowed to establish tunnels. The origin lists are used to prevent random tunnel establishments that may overwhelm the proxy node. A location corresponding to each origin is created, and each location associates security policies applicable to a GRE tunnel of the specific location.

The use of location association, however, can be complicated when used in conjunction with dynamic tunnels that are established using a dynamically assigned public IP address, such as dynamic GRE tunnels. Such tunnels may become periodically inactive when a new IP address is allocated from the pool of IP addresses held by the internet service provider (ISP). Maintaining the list of valid locations in a geographically segmented manner for numerous proxy nodes, and updating the locations in a dynamically adapting population of proxy nodes and tunnel origins, is a challenging task. If the lists of valid locations are not managed accurately, then access may be wrongly associated with locations that had no prior access, and incorrect policies may be applied to particular locations.

SUMMARY

In general, one innovative aspect of the subject matter described in this specification can be embodied in methods that include the actions of accessing tunnel session data storing a session entry for each of a plurality of tunnels sessions for corresponding tunnels, each session entry describing an authentication status, the authentication status for each tunnel session being one of authenticated or unauthenticated; accessing location data describing, for each of a plurality of locations: tunnels associated with the location and that provide data communication between the data processing apparatus and logically independent IP networks, and security policies specific to the location and to be applied to traffic communicated over the tunnels associated with the location; receiving tunnel packets for the logically independent networks in data communication with the data processing apparatus; for each received tunnel packet: determining, from a tunnel identifier associated with the packet and identifying a tunnel from which the packet was received, whether a session entry in the session data exists for the tunnel, and in response to determining that a session entry does not exist in the session data, then creating a session entry for the tunnel, performing an authentication process to determine a location to be associated with the session entry, and associating an entry in the location data for the location with the session entry. Other embodiments of this aspect include corresponding systems, apparatus, and computer programs, configured to perform the actions of the methods, encoded on computer storage devices.

Another innovative aspect of the subject matter described in this specification can be embodied in methods that include the actions of accessing tunnel session data storing a session entry for each of a plurality of tunnels sessions for corresponding tunnels, each session entry describing an authentication status, the authentication status for each tunnel session being one of authenticated or unauthenticated; accessing location data describing, for each of a plurality of locations: tunnels associated with the location and that provide data communication between the data processing apparatus and the logically independent IP networks, and security policies specific to the location and to be applied to traffic communicated over the tunnels associated with the location; in response to a tunnel packet arrival, determining for the packet a session entry status and a location entry status in the tunnel session data and the location data, respectively; in response to determining the existence of a session entry and a location entry in the tunnel session data and the location data, respectively, requesting a location certificate from a client device associated with the tunnel packet; in response to determining the existence of a session entry and an absence of a location entry in the tunnel session data and the location data, respectively, requesting a location certificate from a client device associated with the tunnel packet; in response to determining the absence of a session entry and the existence of a location entry in the tunnel session data and the location data, respectively, creating a corresponding session entry in the tunnel session data structure and requesting a location certificate from a client device associated with the tunnel packet; and in response to determining the absence of a session entry and the absence of a location entry in the tunnel session data and the location data, respectively, creating a corresponding session entry in the tunnel session data structure and requesting a location certificate from a client device associated with the tunnel packet. Other embodiments of this aspect include corresponding systems, apparatus, and computer programs, configured to perform the actions of the methods, encoded on computer storage devices.

The details of one or more embodiments of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION 1.0 Overview

Tunnel session data and location data are used to manage tunnels and apply policies for authenticated tunnel session. A tunnel session is authenticated by one or more of a valid location certificate, presentation of authentication credentials (such as domain cookies, etc.) by a transaction, and presentation of username/password authentication for a user. Locations are indexed using one or more of an organization ID, location identifier passed in a location certificate, or an address range configured for denoting DHCP address space for the location.

An authenticated session is marked unauthenticated by one or more of observing inactivity for a predefined period observed in the tunnel session, conducting certain number of transactions, or when an IP address associated with a tunnel is untrustworthy. Unauthenticated tunnel sessions can be disposed of after one or more conditions are met. This leads to improved resource utilization, as the number of locations/tunnel sessions that are allowed in an unauthenticated state can be reduced, and multiple tunnels to the same location can be better managed.

In some implementations, state changes between authenticated and unauthenticated states for tunnel sessions are done on a transaction boundary, even though the timeout events may occur in the middle of a transaction.

1.1 Example System Architecture

Figure 1:
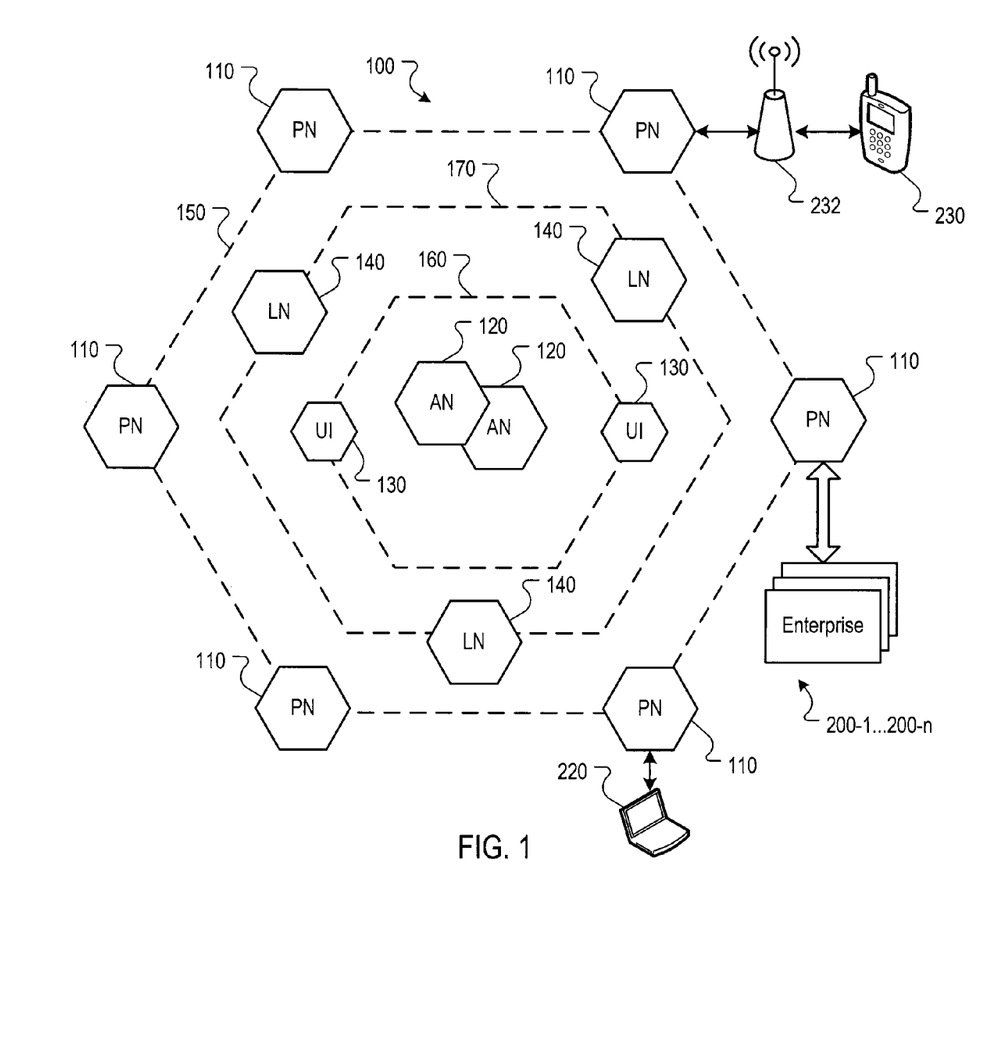
FIG. 1 is a block diagram of a distributed security system.

FIG. 1 is a block diagram of a distributed security system 100. The system 100 can, for example, be implemented as an overlay network in a wide area network (WAN), such as the Internet. The system 100 includes content processing nodes 110 that act as proxy nodes and which detect and preclude the distribution of security threats, e.g., malware, spyware, and other undesirable content sent from or requested by an external system. Example external systems can include an enterprises 200-1 . . . 200-n, a computer device 220, and a mobile device 230, or other network and computing systems.

In an example implementation, each processing node 110 can include a decision system, e.g., data inspection engines that operate on a content item, e.g., a web page, a file, an e-mail message, or some other data or data communication that is sent from or requested by one of the external systems. In some implementations, all data destined for or received from the Internet is processed through a processing node 110.

In other implementations, specific data specified by each external system, e.g., only e-mail, only executable files, etc., is processed through a processing node 110.

Each processing node 110 can identify a threat classification for traffic, e.g., clean, spyware, malware, undesirable content, innocuous, unknown, etc. For example, the processing nodes 110 use data inspection engines to make these identifications. In some implementations, the threat classification can be reduced to a subset of categories e.g., violating, non-violating, neutral, unknown. Based on the subset classification, a processing node 110 may allow distribution of the content item, preclude distribution of the content item, allow distribution of the content item after a cleaning process, or perform threat detection on the content item.

Each processing node 110 can be implemented by a plurality of computer and communication devices, e.g., server computers, gateways, switches, etc. In some implementations, the processing nodes 110 can serve as an access layer 150. The access layer 150 can, for example, provide external system access to the security system 100. In some implementations, each processing node 110 can include Internet gateways and a plurality of server computers, and the processing nodes 110 can be distributed through a geographic region, e.g., throughout a country. According to a service agreement between a provider of the system 100 and an owner of an external system, the system 100 can thus provide security protection to the external system at any location throughout the geographic region.

Data communications can be monitored by the system 100 in a variety of ways, depending on the size and data requirements of the external system. For example, an enterprise 200 may have multiple routers that are used to communicate over the Internet, and the routers may be configured to establish communications through the nearest (in traffic communication time) processing node 110. A mobile device 230 may be configured to communication to a nearest processing node 110 through any available wireless access device, such as an access point, or a cellular gateway. A single computer device 220, such as a consumer's personal computer, may have its browser and e-mail program configured to access the nearest processing node 110, which, in turn, serves as a proxy for the computer device 220. Alternatively, an Internet provider may have all of its customer traffic processed through processing nodes 110.

In some implementations, the processing nodes 110 can communicate with one or more authority nodes 120. The authority nodes 120 can store policy data for each external system and can distribute the policy data to each processing node 110. The policy data can, for example, define security policies for a protected system, e.g., security policies for the enterprise 200. Example policy data can define access privileges for users, web sites and/or content that is disallowed, restricted domains, etc. The authority nodes 120 can distribute the policy data to the processing nodes 110.

In some implementations, the authority nodes 120 can also distribute threat data that includes the classifications of content items according to threat classifications, e.g., a list of known viruses, a list of known malware sites, spam e-mail domains, etc. The distribution of threat data between the processing nodes 110 and the authority nodes 120 can implemented by push and pull distribution schemes.

In some implementations, each authority node 120 can be implemented by a plurality of computer and communication devices, e.g., server computers, gateways, switches, etc. In some implementations, the authority nodes 110 can serve as an application layer 160. The application layer 160 can, for example, manage and provide policy data, threat data, and data inspection engines 117 and dictionaries for the processing nodes.

In some implementations, an enterprise gateway can be configured so that user requests are routed through the processing node 110 by establishing a communication tunnel between enterprise gateway and the processing node. For establishing the tunnel, existing protocols such as generic routing encapsulation (GRE), layer two tunneling protocol (L2TP), or IP security protocols may be used.

Figure 2:
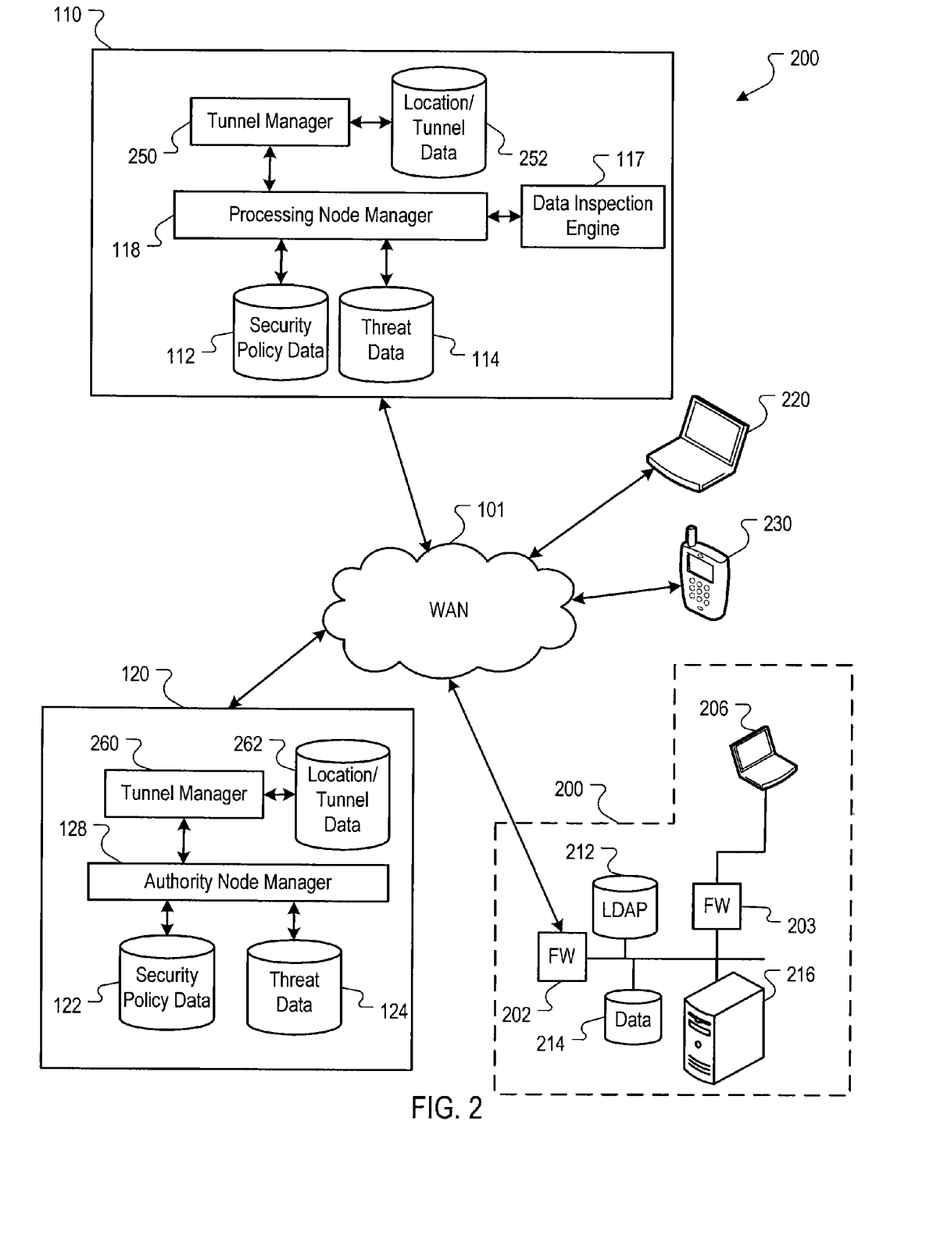
FIG. 2 is a block diagram of the system of FIG. 1 in which the components of FIG. 1 are illustrated in more detail.

FIG. 2 is a block diagram of the system of FIG. 1 in which some of the components of FIG. 1 are illustrated in more detail. Although only one representative component processing node 110 and authority node 120 are illustrated, there can be many of each of the component nodes 110 and 120 present in the system 100. Typically the processing nodes are logically independent nodes, while the authority nodes form a single logical node.

A wide area network (WAN) 101, such as the Internet, or some other combination of wired and/or wireless networks, connects in data communication the processing node 110, authority node 120 and logging node 140. The external systems 200, 220 and 230 likewise communicate over the WAN 101 with each other or other data providers and publishers. Some or all of the data communication of each of the external systems 200, 220 and 230 can be processed through the processing node 110.

FIG. 2 also shows the enterprise 200 in more detail. The enterprise 200 can, for example, include a firewall 202 protecting an internal network that can include one or more enterprise servers 206, a lightweight director access protocol (LDAP) server 212, and other data or data stores 214. Another firewall 203 can protect an enterprise subnet that can include user computers 206 and 208 (e.g., laptop and desktop computers). The enterprise 200 may communicate with the WAN 101 through one or more network devices, such as a router, gateway, etc. The LDAP server 104 may store, for example, user login credentials for registered users of the enterprise 200 system. Such credentials can include a user identifiers, login passwords, and a login history associated with each user identifier. The other data 214 can include sensitive information, such as bank records, medical records, trade secret information, or any other information warranting protection by one or more security measures.

The computer device 220 and the mobile device 230 can also store information warranting security measures, such as personal bank records, medical information, and login information, e.g., login information to the server 216 of the enterprise 200, or to some other secured data provider server.

In some implementations, the processing nodes 110 are external to network edges of the external systems 200, 220 and 230. Each processing node 110 stores security policies 112 received from the authority node 120 and monitors content items requested by or sent from the external systems 200, 220 and 230.

In some implementations, the processing node 110 can include data inspection engines 117. The data inspection engines 117 can be configured to perform a threat detection processes to classify content items according to a threat classification for a corresponding threat. For example, the data inspection engines 117 can include a virus scanner engine that can classify a content item as infected or clean, a network URL filter that can classify a URL address as allowed or restricted, a data leakage protection (DLP) engine that can identify a content item as secure or leaking, and a dynamic content categorization (DCC) engine that can classify a content item as passed or failed.

The list of the data inspection engines 117 is illustrative only; many other data inspection engines 117 can also be used, as can multiple instances of data inspection engines 117, e.g., different types of data leakage engines implementing different data leakage algorithms. The calling of any particular data inspection engine 117 can be predicated on the type of content item to be threat detected. For example, a URL request from the enterprise 200 may cause the processing node manager 118 to call only the URL filter engine.

A processing node manager 118 can manage each content item in accordance with the security policy data 112 and threat data 114, if stored at the processing node 110, so that security policies for a plurality of external systems in data communication with the processing node are implemented external to the network edges for each of the external systems 200, 220 and 230. For example, depending on the classification resulting from the monitoring, the content item can be allowed, precluded, or threat detected. In general, content items that are already classified as "clean" or not posing a threat can be allowed, while those classified as "violating" can be precluded. Those content items having an unknown status, e.g., content items that have not been processed by the system 100, can be threat detected to classify the content item according to threat classifications.

The processing node 110 also includes a tunnel manager 250 and location/tunnel data 252. As will be described with respect to FIG. 3 below, the tunnel manager is a component that manages the status of tunnels and locations, and maintains an association between locations, IP addresses, tunnels, and policy data 112. In particular, the tunnel manager manages the associations in response to dynamic changes in IP addresses of a location, maintains the association of locations with every IP address change so that correct security policies are identified, and manages reporting and billing based on these association.

The tunnel manager 250 can also receive updates propagated from the authority node 120, and stores the updates in the location/tunnel data 252.

In general, the authority node 120 includes a data store that stores master security policy data 122 for each of the external systems 200, 220 and 230. An authority node manager 128 can be used to manage the master security policy data 122, e.g., receive input from users of each of the external systems defining different security policies, and can distribute the master security policy data 122 to each of the processing nodes 110. The processing nodes 110 then store a local copy of the security policy data 112.

The authority node 120 also includes a tunnel manager 260 and location/tunnel data 262. The tunnel manager 260 provides updates across multiple processing nodes 110. For example, when the location/tunnel data 252 is updated in a particular processing node 110, the update may need to be propagated to multiple other processing nodes. In some implementations, the tunnel manager 260 of the authority node receives the update information from the processing node 110, stores the update in the location/tunnel data 262, and propagates the change to the other processing nodes 110.

In alternate implementations, updates are first done at the authority node 120, and then propagated to each necessary processing node 110.

In some implementations, the authority node 120 can also monitor the health of each processing node 110, e.g., the resource availability in each processing node 110, detection of link failures, etc. Based on the observed health of each process node 110, the authority node 120 can redirect traffic among processing nodes 110 and/or balance traffic among the processing nodes 110. Other remedial actions and processes can also be facilitated by the authority node 110.

2.0 Location and Tunneling Association

Figure 3:
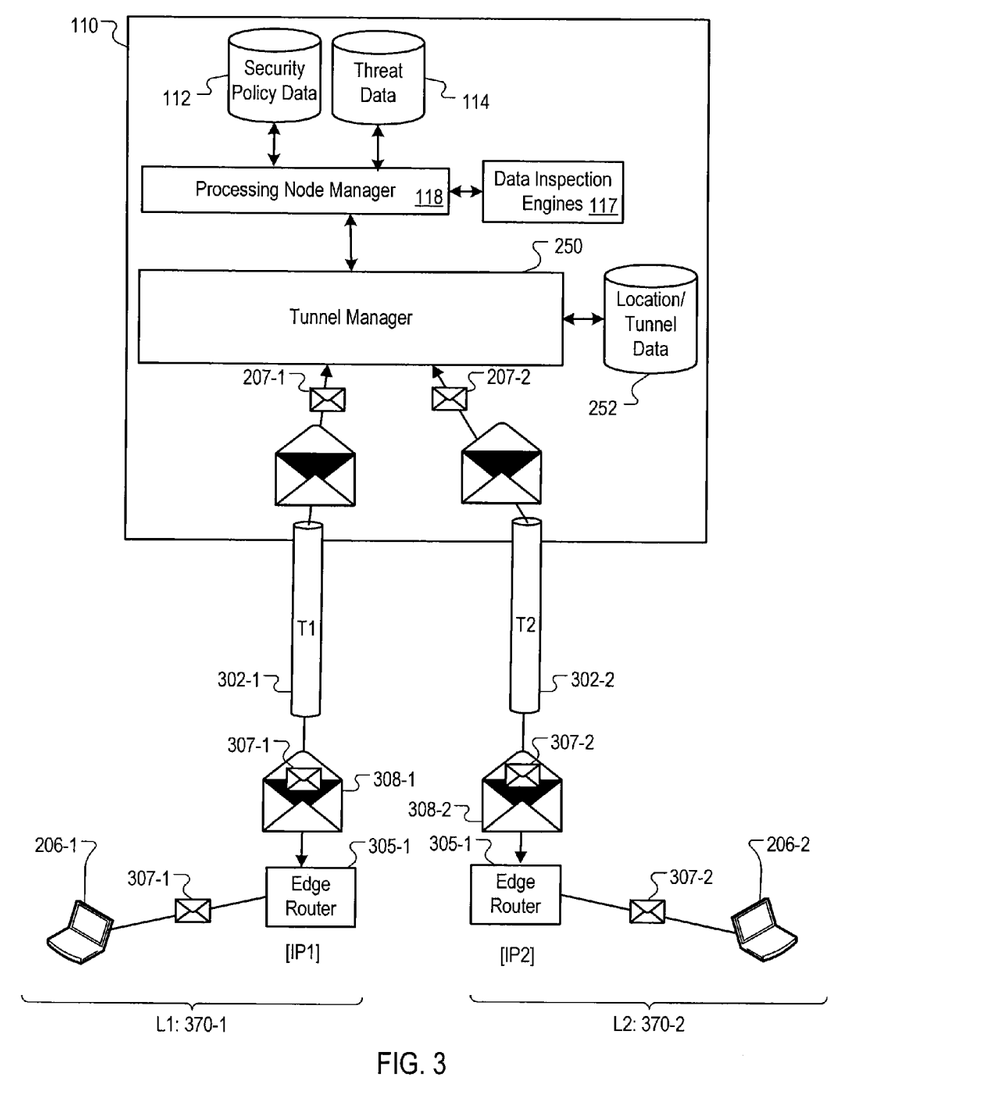
FIG. 3 is a block diagram illustrating tunnel connections between edge routers and a processing node.

FIG. 3 is a block diagram illustrating tunnel connections between edge routers and a processing node. A tunnel 302-1 is established between an edge router 305-1 and the processing node 110, and a tunnel 302-2 is established between an edge router 305-2 and the processing node 110. Only one tunnel for each edge router is shown; however, in operation there are usually multiple tunnels from each edge router to the processing node 110, with the processing node serving as the tunnel destination. The processing node 110 can allocate any of a predefined number of IP addresses as a destination IP address for a tunnel. Thus, each tunnel can be uniquely identified by the combination of its source IP address and its destination IP address. Alternatively, each tunnel can be identified by data from a corresponding location certificate, which is described in more detail below.

In some implementations, the tunnels 302-1 and 302-2 may be established using the GRE protocol. Other protocols can also be used, however. The processing node 110, in turn, implements network address translation (NAT) to establish traffic flow between the processing node 110 and external servers to which the tunneled traffic is directed.

The reverse flow, from the external servers to the client devices 206-1 and 206-2, is directed by performing reverse NAT, and identifying the tunnel 302-1 and 302-2 to which the flow must be associated. The tunnels each respectively correspond to two logically independent location 370-1 and 370-2. The PN 110 receives IP packets 307-1 and 307-2 that have been encapsulated within tunnel packets 308-1 and 308-2 for transport through tunnels 302-1 and 302-2. To perform the tunneling, the edge router 305-1 encapsulates the packet 307-1 as a payload within a tunnel packet 308-1 for transport to the PN 110 through the tunnel 302-1. Similarly, an edge router 305-2 encapsulates the packet 307-2 from the client device 306-2 as a payload within a tunnel packet 308-2 for transport to the PN 110 through the tunnel 302-2.

GRE tunnels are common mechanism used for directing traffic through the processing nodes 110. To prevent random establishment of tunnels, the proxy nodes are provided with a list of valid tunnel origins, which are used to define locations. The origin lists, and the locations created from them are stored in the location/tunnel data 252, specify valid locations and allow the tunnel manager 250 to apply the correct security policies for the traffic associated with a location. The origin lists can be stored in the location/tunnel data. As used herein, a "location" is an entity (or a sub-entity within an entity) for which corresponding policies are specified and for which traffic addressed to and addressed from the location is managed according to these security policies.

Figure 4:
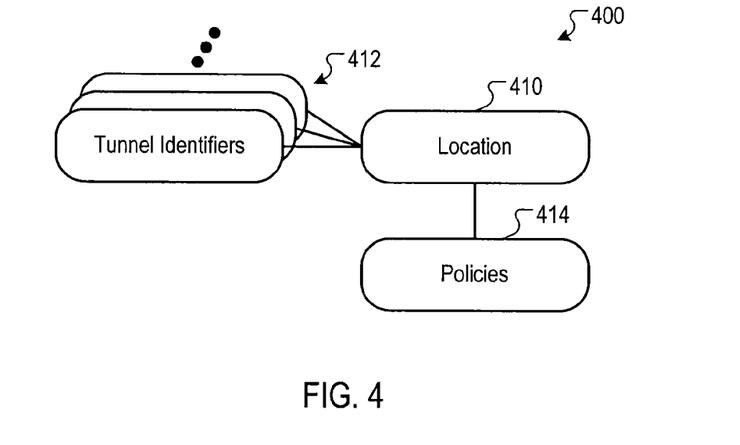
FIG. 4 is an entity relationship diagram for a location data structure.

FIG. 4 is an entity relationship diagram 400 for a location data structure. A location 410 is associated with multiple tunnel identifiers 412 and policies 414. For example, with respect to FIG. 3, the location 370-1 is associated with the IP address IP1, the tunnel identifier T1, and corresponding security policy data 112 for that entity. Likewise, the location 370-2 is associated with the IP address IP2, the tunnel identifier T2, and corresponding security policy data 112 for that entity. Typically a location has one or more public routable IP addresses which can be used to establish tunnels, and at which time for each tunnel one IP address is used (e.g., IP1 for location 370-1). Each established tunnel is identified by the tunnel identifier 414.

The location data structure specifies the policies 414 that are applied to all traffic originating from and addressed to its corresponding location for the associated tunnel. For example, given a tunnel IP address for incoming traffic, a location is identified, and the policies associated with that location are applied.

If, however, the source IP address for the tunnel changes, then the location structure must be updated, and the update must be propagated to all processing nodes that store data for that particular location. The source IP address may change for a variety of reasons. For example, the edge router may not have an IP address lease renewed, and a new IP address may be assigned in accordance with the DHCP protocol. Alternatively, a router may require a re-boot, after which a new IP address is assigned.

As described above, changes in the location structure can be made at the processing node 110 detecting the change, then provided to the authority node 120 for propagating to other processing nodes 110. Alternatively, the detected changes can first be sent to the authority node 120, which then persists the changes and then propagates them to all processing nodes 110 in which the updates are to be stored.

Maintaining an updated list of locations manually is a tedious process and prone to error. The challenges are compounded when, for example, GRE tunnels are originated from enterprise routers that have their public IP addresses assigned dynamically (e.g., routers for coffee shops, internet cafés, home office internet, etc.). Whenever a new IP address is leased, the location/tunnel data must be updated. Failure to update the location/tunnel data in a timely manner results in stale associations of IP addresses to locations. This can result in an unauthorized access. For example, an IP address already listed in the location/tunnel data may be stale (i.e., no longer assigned to a router), and the IP address may be allocated to a location that has not subscribed to the service or which is not authenticated, resulting in unauthorized access.

In some situations, the assigned source IP addresses may, in fact, be swapped. For example, location L1 initially has the IP address IP1, and location L2 initially has the IP address IP2. Due to a new dynamic allocation of IP address, location L2 is assigned IP address IP1 and location L1 is assigned IP address IP2. In general, the location structure can be denoted by the IP address (IP), Policy (P) and other information, such as Organization Information (O). Thus, before the IP address swap, the locations are denoted as follows:

L1=(IP1, P1, O1)
L2=(IP2, P2, O2)

During normal processing, the locations and the policies to be applied are identified by the IP address on the traffic. After IP Swap, the location information is in fact as follows:

L1=(IP2, P1, O1)
L2=(IP1, P2, O2)

The reassigning of source IP addresses is typically done by a DHCP server that is not part of or controlled by the processing nodes 110 or authority node 120. As a result, the system 100 is not initially aware of the IP address swap. Accordingly, the security policies that are linked to the location L1 are applied to tunnels originating from IP address IP1. However, after the swap, the policies of L2 should be applied to tunnels originating from IP address IP1. Moreover, reports generated by the accesses would indicate wrong location.

Additionally, due to the dynamic change in IP addresses to the tunnel endpoints, numerous inactive tunnel sessions (e.g., GRE sessions) may exist. Accordingly, a garbage collection process needs to dispose of these sessions in various data structures in an orderly manner. However, as many tunneling protocols are stateless, merely disposing of the sessions may result in tear downs of valid tunnels.

2.1 Tunnel Management

The tunnel manager (either the tunnel manager 250 or 260, or both) manages the association of locations, tunnels and IP address to provide and track dynamic changes in the IP addresses of the location. The tunnel manager links dynamic tunnels, such as dynamic GRE tunnels, to the same location with every IP address change so that correct security policies are identified and properly applied to incoming and outgoing traffic. Additionally, the tunnel manager identifies the proper organization by the location information such that reporting and billing are correctly executed.

Figure 5:
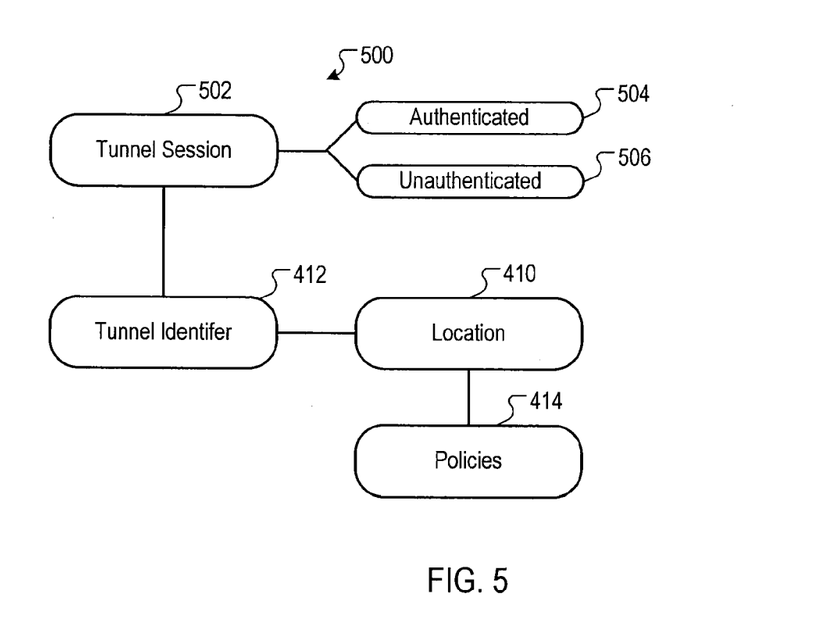
FIG. 5 is an entity relationship diagram for the location data structure and a tunnel session data structure.

In some implementations, the tunnel manager links the location data structure 400 to a tunnel session data structure 500, as shown in FIG. 5. Processing the tunnel packets, the tunnel manager determine whether a session 502, identified by a tunnel identifier (such as a combination of a source IP address and destination/endpoint IP address, or a location certificate), is associated with a particular location in the location data structure 400, and, depending on the determination, performs one or more actions to manage the association of locations, tunnels, and tunnel sessions. In particular, the tunnel manager determines whether to set a session as authenticated (504) or unauthenticated (506). Subsequent procession steps are then taken for subsequent packets that are received.

In combination with the tunnel session data structure for tunnels, the tunnel manager can implement one or more of the following protocols to realize these functions. A first protocol is a protocol that decouples authentication from the IP addresses, and provides location certificates for authentication. Accordingly, locations are looked up and bound to a tunnel session using the location certificates. A second protocol resets authenticated sessions to unauthenticated sessions, and allows unauthenticated traffic for a limited period, the limited period being defined by either one or any combination of a limited time period, a limited number of transactions, or an inactivity timeout. By requiring a re-authentication for the unauthenticated sessions, the IP addresses are confirmed or updated. A combination of the two protocols is also used. Alternatively, the authentication and session establishment may be combined, as is the case with SSTP protocol.

Figure 6A:
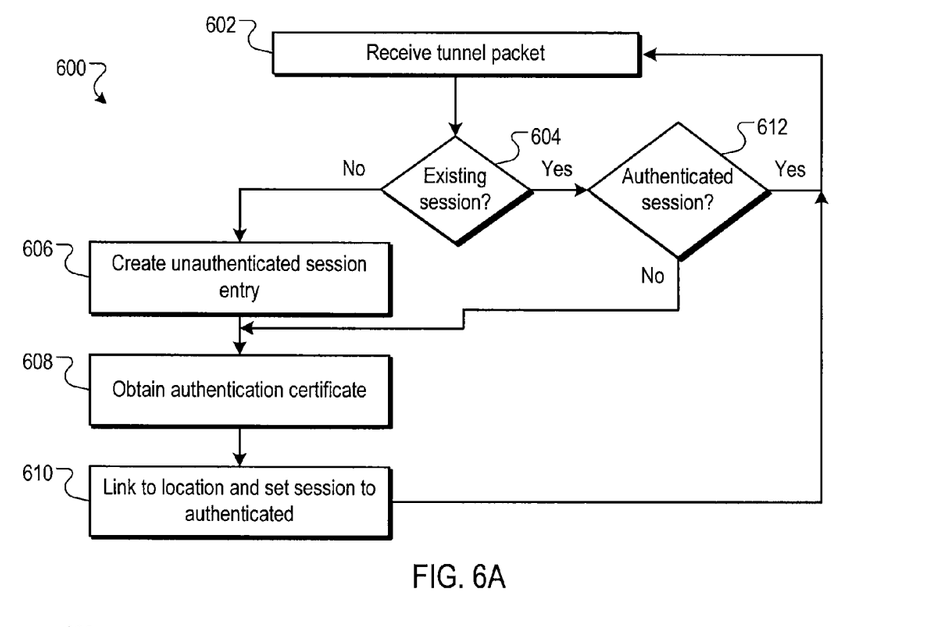
FIG. 6A is a flow diagram of an example process for managing tunnels in response to receiving a packet.

FIG. 6A is a flow diagram of an example process 600 for managing tunnels in response to receiving a packet. The process 600 can, for example, be performed by a tunnel manager in a processing node, or, alternatively, by a tunnel manager in an authority node. The process 600 determines whether an existing session exists for a received packet, and manages the authentication status (e.g., authenticated or unauthenticated).

The tunnel manager receives a tunnel packet (602). For example, when a GRE packet arrives, the tunnel manager looks up a GRE session data structure using the source IP and destination IP address of the GRE packet, or, alternatively, using location certificate data. If the session data structure is not found ("no" decision 604), a new session data structure entry is created and the GRE session data structure is marked unauthenticated (606). Once the first HTTP, FTP, SMTP request arrives, the tunnel manager requests a location certificate and the location certificate is obtained (608). For example, this may involve redirecting or reinitiating the secure version of the application protocol such as HTTPS, sFTP, SMTPS. The authentication certificates encode authentication credentials so that the correct entry in the location data structure may be looked up and bound to the GRE session data structure. For example, on the client side, the client device may provide the corresponding credentials (e.g., the location, name, password, etc.). The location is identified by use of the certificate, and the entry in the location authenticated (610). Thereafter, the process responds to the next tunnel packet received. If, however, the tunnel packet that arrives corresponds to a GRE session in the GRE session data structure, the tunnel manager determines if the GRE session is authenticated (612). If the GRE session is not authenticated, then the tunnel manager requests a location certificate and the location certificate is obtained (608), and processing continues as described above. If the tunnel session is authenticated, then the process responds to the next tunnel packet received.

Figure 6B:
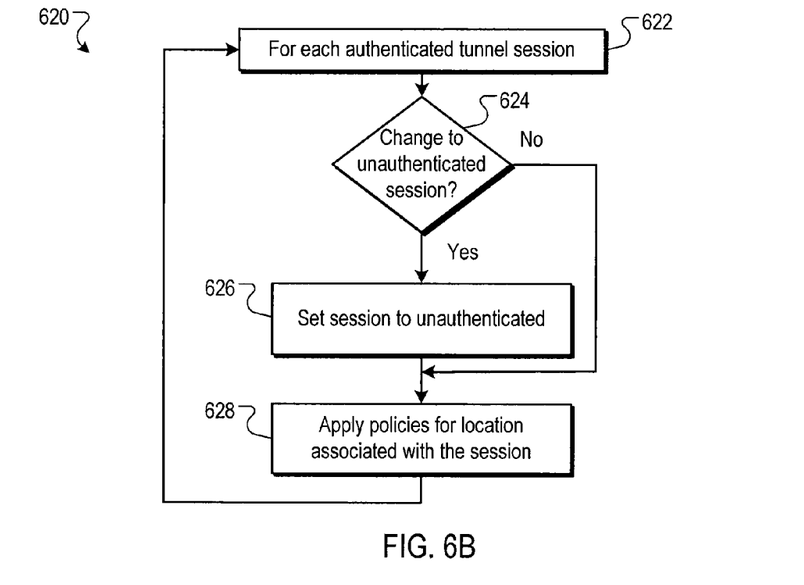
FIG. 6B is a flow diagram of an example process for managing tunnel authentication status of authenticated tunnels.

FIG. 6B is a flow diagram of an example process 620 for managing tunnel authentication status of authenticated tunnels. The process 620 can, for example, be performed by a tunnel manager in a processing node, or, alternatively, by a tunnel manager in an authority node. The process 620 can be performed asynchronously with respect to the process 600.

For each authenticated tunnel session (622), the process 600 determines if the session status should be changed to unauthenticated (624). For example, in response to determining an authentication expiration event has occurred, the tunnel manager changes the status to unauthenticated. For example, in some implementations, when a predefined number of transactions (e.g., number of packets transmitted, a predetermined amount of data transmitted, etc.) are done through an authenticated tunnel, its session status is reset to unauthenticated. Similarly, an authenticated session may become unauthenticated if a preconfigured amount of time has elapsed since the last packet arrival/departure through the attached tunnel.

In still other implementations, a tunnel session can become unauthenticated if an IP address associated with the tunnel is not trustworthy (e.g., the tunnel manager may check the IP addresses of the encapsulated payloads packets and the IP addresses of the tunnel against a list of untrusted IP addresses and determine if there is a match found for either the outer source IP or the inner source or destination IP addresses, the session is marked unauthenticated.

By changing the status to unauthenticated, the tunnel manager, upon receipt of a next packet for the session, will go through an authentication process, thereby confirming (or updating) the IP address for the location entry in data structure 400 (or again precluding authentication if the IP addresses are associated with untrustworthy IP addresses).

In some implementations, tunnel manager uses inactivity-based resetting of GRE sessions to determine if the associations are correct. In some implementations, the inactivity period is selected based on the time required to acquire a DHCP based address lease. Typically, when an IP address of a tunnel origin is dynamically changed, the newly assigned IP address would have been previously inactive. For example, in DHCP's dynamic allocation, an IP address can be allocated for a limited period of time or until the client relinquishes the IP addresses, whichever occurs earlier. The DHCP protocol selects an IP address from a pool of IP addresses using algorithms such as least recently used address. As a consistency check, the selected address is checked by an ICMP echo to make sure that there are no interfaces presently configured with the address. In addition, the receiving client will typically perform and ARP to make sure that there are no concurrent allocation of the new IP address. Once the IP address is allocated, it is used until the lease expires and is renewed.

In some implementations, state changes between authenticated and unauthenticated are done only on a transaction boundary, even though the timeout events may occur in the middle of a transaction. For example, if a timeout occurs prior to the end of an HTTP transaction, FTP transaction, or mail message transaction, the state change will not occur until the end of an HTTP transaction, the FTP transaction, or the mail message transfer.

For other modes of address assigning, other inactivity or leasing timeout can also be used. In general, any reassignment criteria or assignment expiration criterion for a particular assignment protocol can be used to cause an authenticated session to change to an unauthenticated data session.

In the event the tunnel session is determined to be changed, the process 620 sets the tunnel session to unauthenticated (622). In the event the tunnel session is determined not to be changed, or after the tunnel session is set to unauthenticated, policies associated with the location associated with the tunnel session are applied (624). The polices, in some implementations, may result in the application of first security measures for authenticated tunnels sessions, and second security measures that differ from the first security measures for unauthenticated tunnel sessions.

As described above, tunnels can also, or alternatively, be identified by location certificates. An example location certificate contains a location identifier that includes an organization ID and branch identifier that specifies a particular office for a particular subscriber. The data of the location certificate are encoded using an encryption key. Along with the location certificate, or included in the location certificate, is a client (or user) identifier that uniquely identifies a client (or user). In other implementations, a location certificate may contain the policy ID and location identifier. The policy ID is encrypted while the location identifier (Organization ID, Branch ID) is in clear text.

Location certificates may be presented as a digital certificate during the tunnel establishment (e.g., in implementations that use the SSTP protocol instead of other stateless protocols, location certificates are presented at the time of tunnel establishment), session establishment (e.g., GRE HTTP). Location certificates may also be presented as cookies in an HTTP request.

Table 1 below describes actions that the tunnel manager takes in response to particular events and the presence or absence of entries of tunnel sessions and location sessions in the corresponding data structures stored in the location/tunnel data. Each listed state corresponds to the tunnel session status and location status, and each listed tunnel action manager occurs for its given state and tunnel event.

TABLE 1

| State | Tunnel Event | Tunnel Session | Location | Tunnel Manager Action |
|---|---|---|---|---|
| BOUND | Packet arrival | Exists | Exists | Apply policies attached |
| UNBOUND | Packet arrival | Exists | Absent | Request location certificate |
| NEW | Packet arrival | Absent | Exists | Create tunnel session, request location cert |
| INIT | Packet arrival | Absent | Absent | Create tunnel session, request location cert |
| UNBOUND | Cert arrival | Exists | Absent | Create location and bind to tunnel session |
| BOUND | Cert arrival | Exists | Exists | Do nothing. |
| BOUND | Inactivity timeout | Exists | Exists | Detach location |
| UNBOUND | Inactivity timeout | Exists | Absent | Garbage collection on tunnel session entry |
| NEW | Inactivity timeout | Absent | Exists | Garbage collection on location entry |

In the event of a packet arrival in the bound state, in which there are an existing tunnel session and location entries in the tunnel and location data structures, the policies associated with location are applied to the communication.

Additional operations, such as determining to change the status of the tunnel session from authenticated to unauthenticated can also be performed.

In the event of a packet arrival in the unbound state, in which there is only an existing tunnel session entry in the tunnel data structure, the tunnel manager request location certificate from the client device. This is because the absence of a location entry being associated with it will session entry is indicative of the panel that has not been bound to a location. Accordingly, the location certificate is required to bind the tunnel to a particular location.

In the event of a packet arrival in the new state, in which there is only an existing location entry in the location data structure, the tunnel manager creates a corresponding session entry in the session data structure and requests a location certificate. This is because the absence of the session entry when there is a corresponding location entry is indicative of a change in the tunnel structure for particular location, e.g., an IP address may have been reassigned. Accordingly, a new tunnel session entry is created, and the certification process is performed.

In the event of a packet arrival in the initialization state, in which there is no existing tunnel session and location entries in the tunnel and location data structures, the tunnel manager creates a corresponding session entry in the session data structure and requests a location certificate. The absence of both a session entry and a location entry is indicative of a new tunnel being established for a location that is not currently entered in a current location data structure.

In the event of a certificate arrival in the unbound state, in which there is only an existing tunnel session entry in the total data structure, the tunnel manager creates a location entry in the location data structure and binds the session entry to the location. This creates an authenticated tunnel for that location.

In the event of a certificate arrival in the bound state, which there are existing tunnel session and location entries in the tunnel and location data structures, the tunnel manager takes no action, provided the certificate is valid. If the certificate is invalid, the tunnel manager, in some implementations, can cause the tunnel to become unauthenticated.

In the event of an inactivity timeout in the bound state, which there are existing tunnel session and location entries in the tunnel and location data structures, the tunnel manager detaches the location from the session entry, and the state is unbound. This is indicative of a tunnel becoming inactive, e.g., a client device may have been removed from the network without releasing the IP address of the tunnel, and detaching the location from the session facilitates garbage collection or assigning the location to another session that may be created in the event a corresponding packet for that location arrives.

In the event of an inactivity timeout in the unbound state, in which there is only a session entry in the session data structure, the tunnel manager performs a garbage collection process on the session entry in the session data structure. For example, the session entry is removed from the session data structure.

In the event of inactivity timeout an initialization state, in which there is only location entry in the location data structure, the tunnel manager performs a garbage collection process on the location entry in the location data structure. For example, the location entries removed from the location data structure.

In yet another implementation, each time a tunnel is established, an authentication process is performed. For example, when using a tunneling protocol such as the Secure Socket Tunneling Protocol, the location can be identified when the tunnel is established (i.e., each time an IP address is dynamically reassigned). In SSTP, each SSTP servers must be authenticated during the secure socket layer set up phase; each client can optionally be authenticated during the point to point protocol set up phase. As such, the location certificates can be provided during the authentication that occurs when each instance of a tunnel is created. Accordingly, locations are looked up by authenticated IP addresses. In this implementation, the authentication reversion to an unauthenticated state can be omitted. However, the inactivity timeouts can be used to detach locations from tunnel sessions, and facilitate garbage collection.

3.0 Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising: a data processing apparatus in a distributed security system external to a plurality of logically independent internet protocol (IP) networks, wherein at least one or more tunneling communications protocol communications channels are established between the plurality of logically independent IP networks; a memory store in data communication with the data processing apparatus and storing: tunnel session data storing a session entry for each of a plurality of tunnels sessions for corresponding tunnels, each session entry describing an authentication status, the authentication status for each tunnel session being one of authenticated or unauthenticated; wherein user requests from the plurality of logically independent IP networks are routed through one of the plurality of tunnels to the distributed security system for processing therein; location data describing, for each of a plurality of locations: tunnels associated with the location and that provide data communication between the data processing apparatus and the logically independent IP networks; and security policies specific to the location and to be applied to traffic communicated over the tunnels associated with the location unauthenticated; computer-readable instructions executable by the data processing apparatus and that upon execution cause the data processing apparatus to perform operations comprising: receiving tunnel packets for the logically independent networks in data communication with the data processing apparatus; for each received tunnel packet: determining, from a tunnel identifier received as part of tunnel packet and identifying a tunnel from which the packet was received, whether a session entry in the session data exists for the tunnel; in response to determining that a session entry does not exist in the session data, then creating a session entry for the tunnel, performing an authentication process to determine a location to be associated with the session entry, and associating an entry in the location data for the location with the session entry, wherein the authentication process comprises marking the tunnel as unauthenticated for a predefined period of time while observing the tunnel for a certain number of one or more transactions to determine if one or more conditions are met for authentication, and wherein the predefined period of time is greater than at least one transaction; in response to determining that a session entry exists in the session data, determining whether an authentication status indicates the tunnel session is authenticated or unauthenticated; and in response to determining that an authentication expiration event has occurred, changing the authentication status to unauthenticated.

2. The system of claim 1, wherein changing the authentication status to unauthenticated in response to determining that an authentication expiration event has occurred comprises changing the authentication status to unauthenticated when a predetermined number of one or more transactions occur over the tunnel session.

3. The system of claim 1, wherein changing the authentication status to unauthenticated in response to determining that an authentication expiration event has occurred comprises changing the authentication status to unauthenticated when a session timeout for the tunnel session occurs.

4. The system of claim 1, wherein the tunnel sessions are Generic Routing Encapsulation (GRE) tunnel sessions.

5. The system of claim 1, wherein the tunnel sessions are Secure Socket Tunneling Protocol (SSTP) sessions.

6. The system of claim 1, wherein the tunnel identifier associated with a packet comprises a source IP address of the tunnel and a destination IP address of the tunnel.

7. The system of claim 1, wherein the tunnel identifier associated with a packet comprises a location certificate that unique identifies the tunnel over which the IP packet was received.

8. A system, comprising: a data processing apparatus in a distributed security system external to a plurality of logically independent internet protocol (IP) networks, wherein at least one or more tunneling communications protocol communications channels are established between the plurality of logically independent IP networks; a memory store in data communication with the data processing apparatus and storing: tunnel session data storing a session entry for each of a plurality of tunnels sessions for corresponding tunnels, each session entry describing an authentication status, the authentication status for each tunnel session being one of authenticated or unauthenticated; wherein user requests from the plurality of logically independent IP networks are routed through one of the plurality of tunnels to the distributed security system for processing therein; location data describing, for each of a plurality of locations: tunnels associated with the location and that provide data communication between the data processing apparatus and the logically independent IP networks; and security policies specific to the location and to be applied to traffic communicated over the tunnels associated with the location; computer-readable instructions executable by the data processing apparatus and that upon execution cause the data processing apparatus to perform operations comprising: in response to a tunnel packet arrival, determining for the packet a session entry status and a location entry status in the tunnel session data and the location data, respectively; in response to determining the existence of a session entry and a location entry in the tunnel session data and the location data, respectively, requesting a location certificate from a client device associated with the tunnel packet respectively; in response to determining the existence of a session entry and an absence of a location entry in the tunnel session data and the location data, respectively, requesting a location certificate from a client device associated with the tunnel packet; in response to determining the absence of a session entry and the existence of a location entry in the tunnel session data and the location data, respectively, creating a corresponding session entry in the tunnel session data structure and requesting a location certificate from a client device associated with the tunnel packet, wherein the tunnel session is marked as unauthenticated for a predefined period of time while observing the tunnel for a certain number of one or more transactions to determine if one or more conditions are met for authentication, and wherein the predefined period of time is greater than at least one transaction; and in response to determining the absence of a session entry and the absence of a location entry in the tunnel session data and the location data, respectively, creating a corresponding session entry in the tunnel session data structure and requesting a location certificate from a client device associated with the tunnel packet, wherein the tunnel session is marked as unauthenticated for a predefined period of time while observing the tunnel for a certain number of one or more transactions to determine if one or more conditions are met for authentication, and wherein the predefined period of time is greater than at least one transaction.

9. The system of claim 8, wherein the instructions cause the data processing apparatus to perform operations comprising:
   in response to a location certificate arrival, determining for the location certificate a session entry status and a location entry status in the tunnel session data and the location data, respectively;
   in response to determining the existence of a session entry and an absence of a location entry in the tunnel session data and the location data, respectively, creating a location entry in the location data and requesting a location certificate from a client device associated with the tunnel packet; and
   in response to determining the existence of a session entry and the existence of a location entry in the tunnel session data and the location data, respectively, binding the location entry to the session entry.

10. The system of claim 9, wherein the instructions cause the data processing apparatus to perform operations comprising:
   in response to an inactivity timeout for a session associated with a session entry in the session data and also associated with a location entry in the location data, disassociating the session entry from the location entry;
   in response to an inactivity timeout for a session associated with a session entry in the session data and not associated with a location entry in the location data, removing the session entry from the session data; and
   in response to an inactivity timeout for a location associated with a location entry in the location data and not associated with a session entry in the tunnel session data, removing the location entry from the location data.

11. The system of claim 8, wherein the instructions cause the data processing apparatus to perform operations comprising:
   in response to an inactivity timeout for a session associated with a session entry in the session data and also associated with a location entry in the location data, disassociating the session entry from the location entry;
   in response to an inactivity timeout for a session associated with a session entry in the session data and not associated with a location entry in the location data, removing the session entry from the session data; and
   in response to an inactivity timeout for a location associated with a location entry in the location data and not associated with a session entry in the tunnel session data, removing the location entry from the location data.

12. The system of claim 8, wherein the tunnel session are Secure Socket Tunneling Protocol (SSTP) sessions.

13. The system of claim 8, wherein the tunnel session are Generic Routing Encapsulation (GRE) sessions.

14. A method performed by a data processing apparatus, comprising: accessing tunnel session data storing a session entry for each of a plurality of tunnels sessions for corresponding tunnels, each session entry describing an authentication status, the authentication status for each tunnel session being one of authenticated or unauthenticated; accessing location data describing, for each of a plurality of locations: tunnels associated with the location and that provide data communication between the data processing apparatus in a distributed security system and logically independent Internet Protocol (IP) networks therefrom, wherein user requests from the plurality of logically independent IP networks are routed through one of the plurality of tunnels to the distributed security system for processing therein, and wherein at least one or more tunneling communications protocol communications channels are established between the plurality of logically independent IP networks; and security policies specific to the location and to be applied to traffic communicated over the tunnels associated with the location; receiving tunnel packets for the logically independent networks in data communication with the data processing apparatus; for each received tunnel packet: determining, from a tunnel identifier received as part of tunnel packet and identifying a tunnel from which the packet was received, whether a session entry in the session data exists for the tunnel; and in response to determining that a session entry does not exist in the session data, then creating a session entry for the tunnel, performing an authentication process to determine a location to be associated with the session entry, and associating an entry in the location data for the location with the session entry, wherein the authentication process comprises marking the tunnel as unauthenticated for a predefined period of time while observing the tunnel for a certain number of one or more transactions to determine if one or more conditions are met for authentication, and wherein the predefined period of time is greater than at least one transaction; in response to determining that a session entry exists in the session data, determining whether an authentication status indicates the tunnel session is authenticated or unauthenticated; and in response to determining that an authentication expiration event has occurred, changing the authentication status to unauthenticated.

15. The method of claim 14, wherein changing the authentication status to unauthenticated in response to determining that an authentication expiration event has occurred comprises changing the authentication status to unauthenticated when a predetermined number of one or more transactions occur over the tunnel session.

16. The method of claim 14, wherein the tunnel sessions are Generic Routing Encapsulation (GRE) tunnel sessions.

17. The method of claim 14, wherein the tunnel identifier associated with a packet comprises a source IP address of the tunnel and a destination IP address of the tunnel.

18. The method of claim 14, wherein the tunnel identifier associated with a packet comprises a location certificate that unique identifies the tunnel over which the IP packet was received.

19. A method, comprising: accessing tunnel session data storing a session entry for each of a plurality of tunnels sessions for corresponding tunnels, each session entry describing an authentication status, the authentication status for each tunnel session being one of authenticated or unauthenticated; accessing location data describing, for each of a plurality of locations: tunnels associated with the location and that provide data communication between the data processing apparatus in a distributed security system and logically independent Internet Protocol (IP) networks therefrom, wherein user requests from the plurality of logically independent IP networks are routed through one of the plurality of tunnels to the distributed security system for processing therein, and wherein at least one or more tunneling communications protocol communications channels are established between the plurality of logically independent IP networks; and security policies specific to the location and to be applied to traffic communicated over the tunnels associated with the location; in response to a tunnel packet arrival, determining for the packet a session entry status and a location entry status in the tunnel session data and the location data, respectively; in response to determining the existence of a session entry and a location entry in the tunnel session data and the location data, respectively, requesting a location certificate from a client device associated with the tunnel packet; in response to determining the existence of a session entry and an absence of a location entry in the tunnel session data and the location data, respectively, requesting a location certificate from a client device associated with the tunnel packet; in response to determining the absence of a session entry and the existence of a location entry in the tunnel session data and the location data, respectively, creating a corresponding session entry in the tunnel session data structure and requesting a location certificate from a client device associated with the tunnel packet, wherein the tunnel session is marked as unauthenticated for a predefined period of time while observing the tunnel for a certain number of one or more transactions to determine if one or more conditions are met for authentication, and wherein the predefined period of time is greater than at least one transaction; and in response to determining the absence of a session entry and the absence of a location entry in the tunnel session data and the location data, respectively, creating a corresponding session entry in the tunnel session data structure and requesting a location certificate from a client device associated with the tunnel packet, wherein the tunnel session is marked as unauthenticated for a predefined period of time while observing the tunnel for a certain number of one or more transactions to determine if one or more conditions are met for authentication, and wherein the predefined period of time is greater than at least one transaction.

20. The method of claim 19, further comprising:
in response to a location certificate arrival, determining for the location certificate a session entry status and a location entry status in the tunnel session data and the location data, respectively;
in response to determining the existence of a session entry and an absence of a location entry in the tunnel session data and the location data, respectively, creating a location entry in the location data and requesting a location certificate from a client device associated with the tunnel packet; and
in response to determining the existence of a session entry and the existence of a location entry in the tunnel session data and the location data, respectively, binding the location entry to the session entry.

21. The method of claim 19, further comprising:
in response to an inactivity timeout for a session associated with a session entry in the session data and also associated with a location entry in the location data, disassociating the session entry from the location entry;
in response to an inactivity timeout for a session associated with a session entry in the session data and not associated with a location entry in the location data, removing the session entry from the session data; and
in response to an inactivity timeout for a location associated with a location entry in the location data and not associated with a session entry in the tunnel session data, removing the location entry from the location data.

22. The method of claim 19, further comprising:
in response to an inactivity timeout for a session associated with a session entry in the session data and also associated with a location entry in the location data, disassociating the session entry from the location entry;
in response to an inactivity timeout for a session associated with a session entry in the session data and not associated with a location entry in the location data, removing the session entry from the session data; and
in response to an inactivity timeout for a location associated with a location entry in the location data and not associated with a session entry in the tunnel session data, removing the location entry from the location data.

23. The method of claim 19, wherein the tunnel session are Secure Socket Tunneling Protocol (SSTP) sessions.

* * * * *